Sept. 27, 1932.  L. L. LOMAR  1,879,364

COUPLING

Filed Oct. 11, 1929

Inventor

Louis L. Lomar

By J. Vincent Martin

Attorney

Patented Sept. 27, 1932

1,879,364

UNITED STATES PATENT OFFICE

LOUIS L. LOMAR, OF HOUSTON, TEXAS

COUPLING

Application filed October 11, 1929. Serial No. 398,884.

This invention relates to couplings for sections of pipe, tube, hose, rod and the like.

Its general object is the provision of a new and improved coupling whereby such sections may be quickly, easily and strongly connected together, and as readily disconnected.

Another of its objects is to provide a coupling embodying new and improved elements which, when locked together to effect the connection of fluid conveying pipes and the like, automatically become fluid tight.

Various other objects will hereinafter appear.

Figure 2:
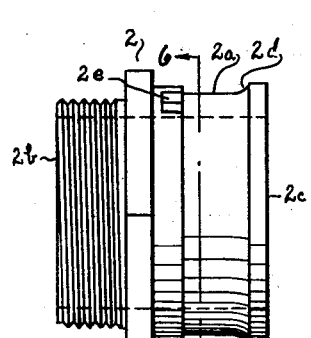
Figure 1:
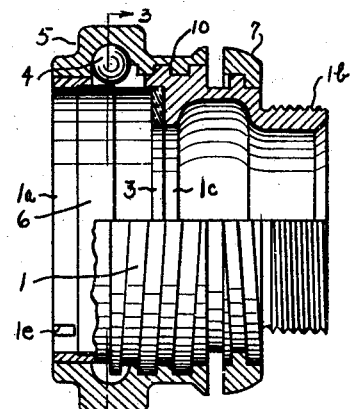
Figure 3:
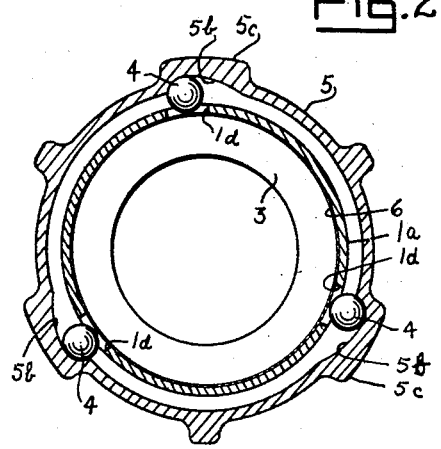
Figure 4:
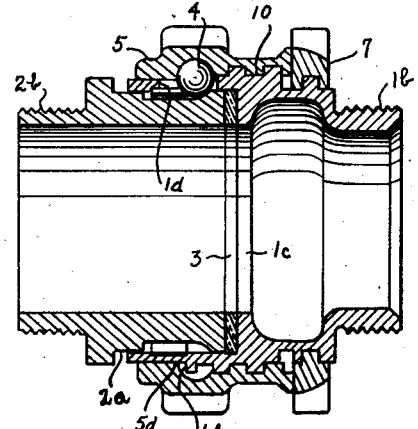
Figure 5:
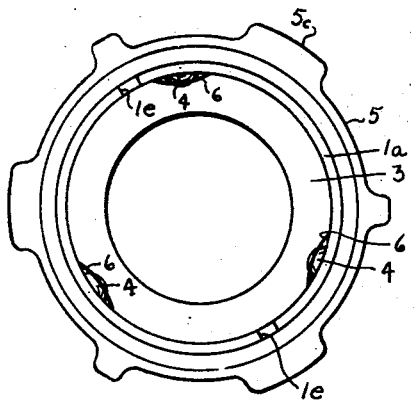
Figure 6:
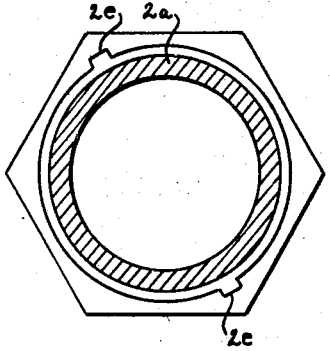

In the accompanying drawing, which is illustrative of the preferred embodiment of the invention, Fig. 1 is a partly sectional side view of the receiving member of the coupling with the elements in position for the reception of the received member; Fig. 2, a side view of the received member; Fig. 3, a vertical section on the line 3—3 of Fig. 1; Fig. 4, a vertical section of the coupling with its members locked together; Fig. 5, an end view of the received member with the locking elements thereof in active positions; and Fig. 6, a vertical section on the line 6—6 of Fig. 2.

The coupling embodies generally a receiving member, a received member, and means to lock and seal the latter in the former.

As shown by Fig. 1, the receiving member includes a body having an inner end 1a of relatively great internal diameter for the reception of the inner end 2a of the received member 2. The outer end 1b of the body of the receiving member and the outer end 2b of the received member are threaded for attachment to pipe sections or the like (not shown) to be connected.

The body of the receiving member has an internal annular flange 1c, upon which is a gasket 3 to form a seat for the annular flange 2c of the received member.

The inner end 1a of the body of the receiving member has openings 1d therein in which the balls 4 are radially movable. A locking ring 5 surrounds said body adjacent said openings, is threaded on said body as indicated at 10, and has inclined raceways 5b to actuate the balls 4. The inward movement of the balls 4 in the openings 1d is limited by the spring retaining ring 6 which fits within an internal annular groove in the body 1. Figs. 1 and 3 disclose the elements of the receiving member in their relative inactive positions. The balls 4 are then disposed intermediate the raceways 5b and the retaining ring 6. The inner end 2a of the received member may then be inserted in the inner end 1a of the body of the receiving member. If the body 1 is then held stationary and the locking ring 5 rotated thereon in an anti-clockwise direction with respect to Fig. 3, said ring will move toward the outer end 1b of the receiving member, that is, toward the position shown by Fig. 4, and the balls 4 will simultaneously be moved inwardly in the openings 1d into engagement with the inclined portion 2d of the received member to move the flange 2c thereof into compressing engagement with the gasket 3. The members are thereby sealed as well as locked together.

It will be seen that Figs. 1 and 3 disclose the balls in their inactive positions, and that Figs. 4 and 5 disclose the balls in their active positions. The received member is not shown in Fig. 5 in order that the active positions of the balls may be shown. It will be understood that the balls are not moved into the position shown by Fig. 5 until after the received member 2 has been inserted in the receiving member as shown by Fig. 4. It will also be observed that the retaining ring 6 gives to permit inward movement of the balls, and that the balls move not only inwardly but also from behind toward the side of said ring.

Ribs 5c of the retaining ring 5 serve not only as means to be gripped by the operator, but also to permit the cutting of the raceways 5b without weakening the locking ring.

To hold the locking ring in its active position, that is, the position shown by Fig. 4, the lock nut 7 is provided. The ring 5 and nut 7 are oppositely threaded on the body 1, as shown.

To prevent relative rotation of the member 1 and the member 2, the former is provided with slots 1e for the reception of the lugs 2e of the latter.

To disconnect the couplings, it is necessary only to loosen the lock nut 7 and rotate the locking ring 5 from the position shown by Fig. 4 to the position shown by Fig. 1. When the locking ring is so rotated the raceways 5b are brought into position for the reception of the balls 4, and the spring retaining ring 6 moves the balls into said raceways out of the path of the flange 2c of the received member.

As shown by Fig. 3, clockwise rotation of the locking ring 5 on the body 1 is limited by the engagement of the balls 4, the body 1 and the end walls of raceways 5b. If such rotation were not limited, the locking ring 5 might be rotated off the inner end 1a of the receiving member 1. Rotation of the locking ring 5 in the reverse direction, that is, toward the outer end 1b of the receiving member, is limited by the engagement of the internal annular flange 5b of the locking ring and the innermost extremity 1f of the thread of the body 1. If such reverse rotation were not prevented, the balls would ride out of one raceway 5b and into another raceway 5b, and the members would consequently become unlocked. In other words, when the ring 5 is rotated from the position shown in Fig. 3 to the position shown in Fig. 5 the balls 4 are intermediate the raceways 5b, and the ring 5 cannot be rotated further because of the engagement of the thread 1f and the flange 5d just referred to. The operator thereupon tightens the lock nut 7 to hold the locking ring 5 in that position.

It will be observed that no twisting of the sections of pipe, rod, or hose, which the coupling is used to connect can affect the locking means above described, because the consequent strains are taken by the received member and the body of the receiving member, and not imparted to the locking ring 5.

I have here described the preferred embodiment of the invention but it is to be understood that the hereinafter appearing claims are not limited thereto. Various modifications thereof will at once occur to those skilled in the art.

I claim:

1. A coupling having a receiving body and a received member, said receiving body having openings therein, balls in said openings, a locking ring on said receiving body and having internal raceways to move said balls inwardly into locking engagement with said received member, and a yieldable retaining ring within said body to limit the inward movement of said balls and to normally hold them in their inactive positions.

2. A coupling having a receiving body and a received member, said receiving body having openings therein, balls in said openings, a ring having inclined raceways to move said balls into locking engagement with said received member, a locking nut for said ring, said ring and nut being oppositely threaded on said body.

3. A coupling having a receiving body and a received member, said receiving body having radial openings therein and an internal annular flange, balls movable in said openings, a gasket on said flange, a ring threaded on said body and having internal raceways to simultaneously move said balls into locking engagement with said received member and said received member into compressing engagement with said gasket, and a locking nut threaded on said body adjacent said ring.

4. A coupling receiving member having a body, radial openings in said body, balls in said openings, a ball actuating ring on said body, and a ball retaining resilient ring within said body.

In testimony whereof, I hereunto affix my signature.

LOUIS L. LOMAR.